United States Patent [19]
Ronning

[11] 3,771,294
[45] Nov. 13, 1973

[54] NEGATIVE PRESSURE FEEDER-SEPARATOR IN CLOSED LOOP PRODUCT GRIND AND DISCHARGING SYSTEM

[75] Inventor: Richard L. Ronning, Overland Park, Kans.

[73] Assignee: Ronning Engineering Co., Inc., Overland Park, Kans.

[22] Filed: Nov. 23, 1970

[21] Appl. No.: 91,628

[52] U.S. Cl. ................... 55/345, 55/430, 55/454, 55/460
[51] Int. Cl. ............................................. B01d 45/12
[58] Field of Search ............... 55/338–340, 34, 454, 55/459, 460; 209/144, 211; 210/512

[56] References Cited
UNITED STATES PATENTS

| | | | |
|---|---|---|---|
| 1,928,702 | 10/1933 | O'Mara | 55/338 |
| 2,010,231 | 8/1935 | Heist | 55/459 |
| 2,085,506 | 6/1937 | McKeown | 55/460 |
| 2,236,548 | 4/1941 | Prouty | 55/459 |
| 2,568,032 | 9/1951 | Sephanoff | 55/459 |

FOREIGN PATENTS OR APPLICATIONS

| | | | |
|---|---|---|---|
| 231,716 | 12/1960 | Australia | 55/459 |
| 1,314,386 | 12/1962 | France | 209/211 |

*Primary Examiner*—Bernard Nozick
*Attorney*—Schmidt, Johnson, Hovey & Williams

[57] ABSTRACT

A method and apparatus for processing an agricultural product utilizing a closed loop negative pressure system to convey the agri-product through the apparatus yet permitting ready removal thereof from the conveying loop at a selected location. The undehydrated product is dried in a hot gas dryer and then conveyed under the influence of a negative pressure-inducing blower, into a frustoconical primary collector where the product, dust, and other light particles are separated from the conveying media. The primary collector-separator is maintained under a negative pressure by the aforementioned blower which also facilitates removal of the lighter foreign material. As a result of the frustoconical configuration of the collector-separator and its tangential material inlet and outlet, superior separation is achieved and the agri-product and particulates are maintained in motion and conveyed into a hammer mill comminutor under the influence of another negative pressure-inducing blower. A meal collector which is located adjacent to and on the negative pressure side of the latter-mentioned blower receives the comminuted agri-product from the hammer mill and separates it from the adjacent blower airstream. The output of the adjacent blower is directed back to the primary collector-separator for recirculation through the apparatus.

3 Claims, 5 Drawing Figures

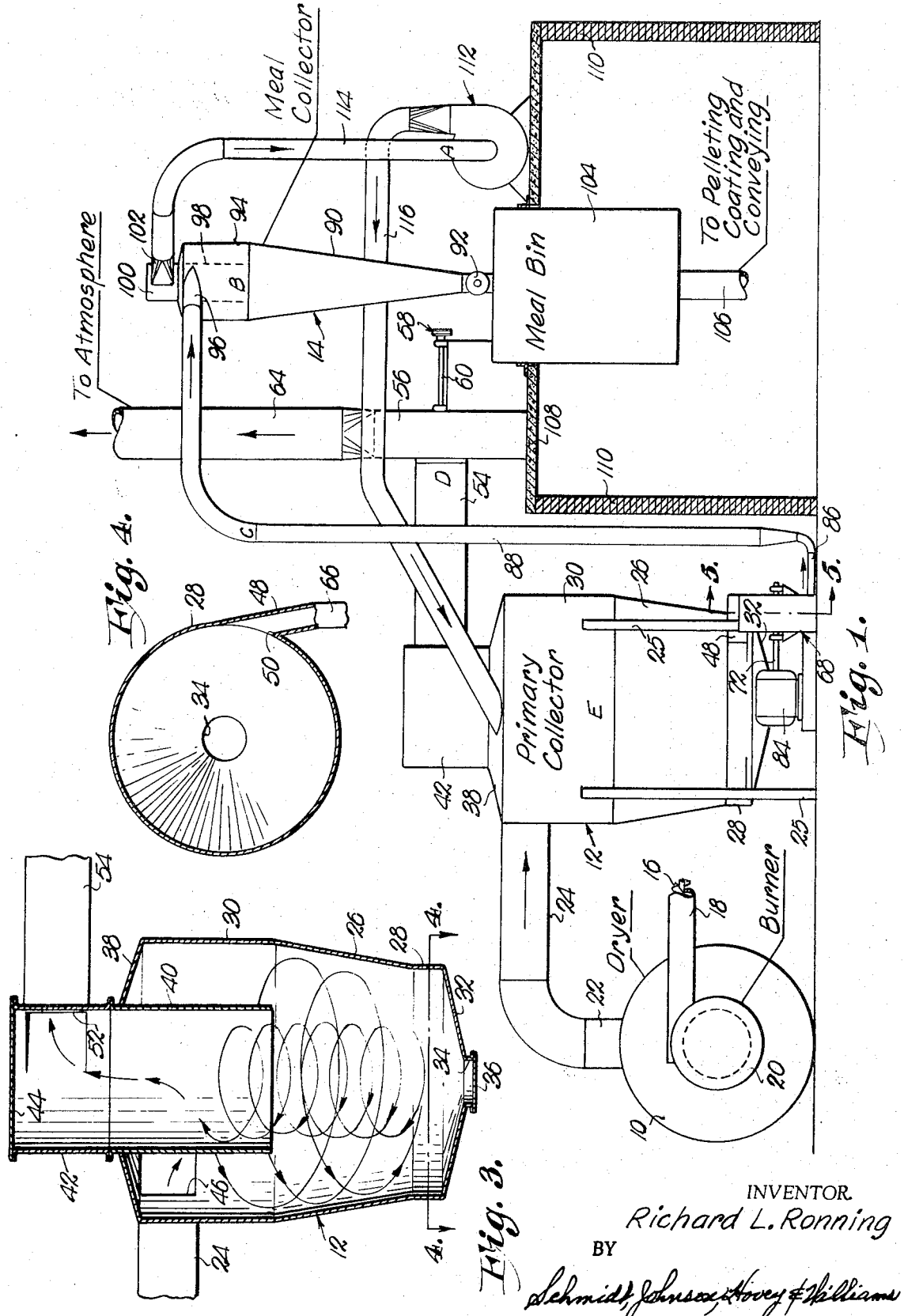

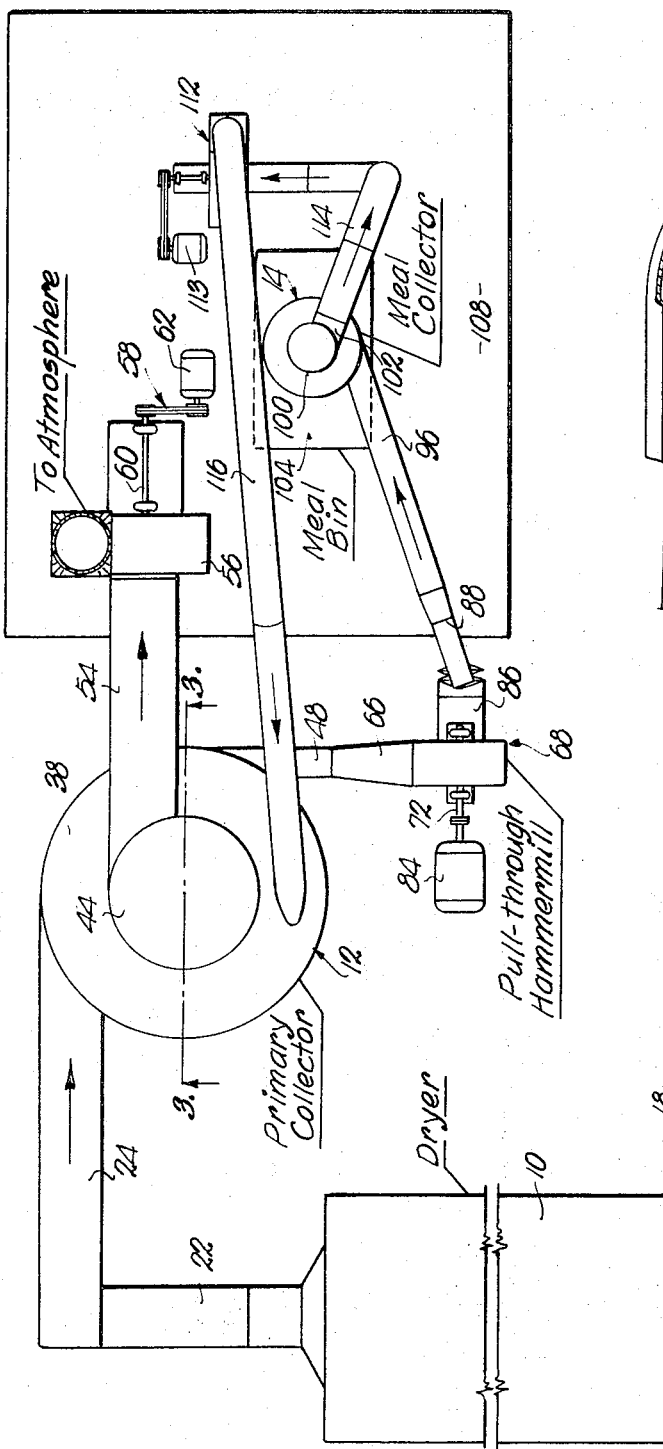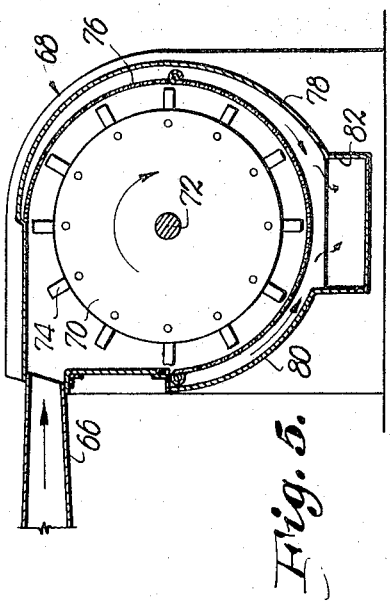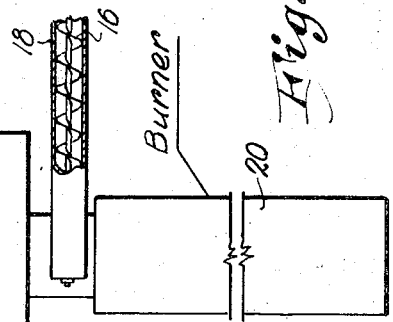

NEGATIVE PRESSURE FEEDER-SEPARATOR IN CLOSED LOOP PRODUCT GRIND AND DISCHARGING SYSTEM

This invention relates to apparatus for separating agricultural products and particulates from a conveying media and then processing and collecting the agri-products, all under a negative pressure.

Previously known apparatus for processing agricultural products, such as alfalfa, whole plant corn or forage sorghums, other forage grasses, brewers' grains and beet pulp, have been of either the positive pressure type or a combination negative and positive pressure type. There are disadvantages to both of the aforementioned types of processing apparatus and the methods utilized in conjunction with such apparatus. With a positive pressure system, it is necessary to move material through a positive-acting blower fan. The fan must necessarily be relatively large to handle an acceptable volume of material and must be repaired frequently because of the heavy wear resulting from material passing through the fan.

With a conventional negative pressure system wherein material is moved through the apparatus under the influence of a negative pressure-inducing fan, it is necessary to employ an air lock between the areas of atmospheric pressure material discharge, and zones of negative pressure, thereby adding to the overall cost of the apparatus and decreasing its efficiency because of the difficulty of passing a stemmed material such as grass through the air locks.

It is, therefore, an object of the present invention to provide apparatus for dehydrating and processing a product such as alfalfa or forage crops wherein a negative pressure is maintained throughout the apparatus, thereby eliminating the need for an air lock between areas of atmospheric and negative pressure.

As a corollary to the above object, it is an object of this invention to provide dehydrating and processing apparatus wherein the output from one of the negative pressure-inducing blowers is recycled through the apparatus, thereby reducing the power requirements for the blower by virtue of the fact that the discharge of the same is directed into an area of negative pressure while at the same time reducing air pollution by recycling any fine particles of material entrained in the airstream of the blower. Similarly, use of a negative pressure system makes it unnecessary to direct all of the material being treated through the blower itself, thus increasing the life of the fan and resulting in much quieter operation of the apparatus.

An aim of this invention is the provision of apparatus for separating agri-products and particulates from a conveying media therefore wherein superior separation is achieved through the use of a frustoconical separator which uniquely maintains maximum centrifugal force on the agri-products and particulates until the products and particulates are discharged from the separator for maximum efficiency, thus avoiding the inherent defect of conventional cyclones which necessarily rely to a certain extent on gravitational separation which is less effective than centrifugal separation.

Another aim of the present invention is to provide apparatus for separating agri-products and particulates from a conveying media where the agri-product is removed tangentially from the separating chamber while still in motion, thereby avoiding entrainment of the agri-product in the fluid conveying media in the separator which would decrease its separating efficiency. The conveying media is a mixture of hot air, products of combustion and water vapor.

Still another object of the invention is to provide separating apparatus of the type set forth in the foregoing object wherein cleanout and maintenance of the separating chamber is substantially reduced by maintaining a continuous flow of the conveying media therethrough at or above conveying velocity. Furthermore, decrease of the effective height of the separator makes it easier to install and service.

A still further important object of the invention is to provide a negative pressusre system for treating agri-products as described wherein start-up of the plant is virtually foolproof as compared with positive pressure arrangements, particularly from the standpoint of elimination of fire hazards.

It is also an object of this invention to provide apparatus for processing agricultural grasses which eliminate any need to pass material through a positive blower fan with its inherent disadvantages as a result of the maintenance of a negative pressure throughout the apparatus.

In the drawings:

FIG. 1 is a partially schematic, side elevational view of the apparatus of the invention with arrows indicating the direction of material flow through the apparatus;

FIG. 2 is a top plan view of the apparatus illustrated in FIG. 1;

FIG. 3 is an enlarged, central, vertical cross-sectional view of the primary collector which forms a part of the apparatus;

FIG. 4 is a cross-sectional view taken along line 4—4 of FIG. 3; and

FIG. 5 is a cross-sectional view taken along line 5—5 of FIG. 1 and illustrating details of the hammer mill utilized in the present invention.

Referring initially to the apparatus as it is illustrated in FIG. 1, it is seen that a dryer 10 communicates with a primary collector 12 and the latter is, in turn, connected with a meal collector 14. Material to be processed, such as freshly cut alfalfa, forage crop or pulp material, is introduced into the dryer 10 by an auger 16 enclosed within a cylindrical housing 18. The dryer 10 is of a type well known to those skilled in the art and has a flow of hot air flowing therethrough induced by blower means 58 described hereinafter so that, upon rotation of the cylindrical section, the agri-product introduced into the inlet of the dryer slowly advances toward the outlet of the same. A burner 20 provides a continuous source of hot air for the dryer 10. A pipe 22 communicates with the outlet of the dryer 10 and is joined to a duct 24 which leads to the inlet structure of collector 12.

The collector 12 is supported by a plurality of upright standards 25, two of which are visible in FIG. 1. The collector 12 which is detailed in FIGS. 3 and 4 includes a tubular frustoconical intermediate section 26 which is stacked on a lower circular section 28 while an upper circular section 30 is stacked on the section 26. Bottom wall 32 of section 28 has a centrally disposed cleanout port 34 which is covered by a removable plate 36. An annular top wall 38 is provided with a centrally disposed aperture for receiving a cylindrical shroud 40 which extends downwardly into the collector 12 to a point just above the uppermost edge of the section 26. A cylindrical stack 42 is positioned atop the shroud 40 to form an extension of the latter. An end wall 44 closes the upper end of the stack 42. A material inlet opening 46 in the section 30 communicates the interior of the collector 12 with the duct 24. As best illustrated in FIG. 2, the duct 24 extends tangentially from the circular section 30. The agri-product and particulates are separated from the conveying media in separator 12 and the agri-products and particulates are discharged from the separator through outlet structure in the form of a duct 48 which communicates with a heavier material outlet opening 50 in the section 28. As is clear from FIGS. 2 and 4, the duct 48 extends tangentially from the circular section 28. The conveying media which is separated in the collector-separator 12 is removed through an outlet opening 52 in the stack 42. Exhaust structure in the form of a duct 54 communicates with the opening 52 and extends tangentially from the stack 42 as is clear from viewing FIG. 2.

The duct 54 communicates with housing 56 which encloses the fan of a negative pressure-inducing blower designated generally by the numeral 58. The fan (not shown) is on a shaft 60 which is driven by a motor 62. The output of the blower 58 is directed upwardly through a stack 64 which opens to the atmosphere.

The agri-product and particulates discharged through the duct 48 travels through a conduit 66 which communicates the collector-separator 12 with a comminutor in the form of a hammer mill 68 which, for example, preferably should be of the type shown in my U.S. Pat. No. 3,429,349. Hammer mill 68 as shown in said Patent includes a plurality of plates 70, one of which is visible in FIG. 5, mounted upon a shaft 72 in spaced relationship with each of the plates having a plurality of hammer elements 74 extending radially from their outer edges. A screen 76 extends approximately 270° around the circumference of the plates 70 in closely spaced relationship to the hammer elements 74. A pair of arcuate deflector members 78 and 80 direct material which has passed through the screen 76 into an outlet opening 82 at the bottom of the hammer mill 68. The hammer mill 68 is powered by a motor 84 which drives the shaft 72. An outlet duct 86 which communicates with the opening 82 couples the hammer mill 68 with a conduit 88 which also communicates with the meal collector 14.

The meal collector 14 includes a conical section 90 which is closed at its lower end by an air lock 92 and has a circular section 94 on top of the section 90. A tangentially disposed inlet duct 96 extends between the section 94 and the conduit 88. A shroud 98 is centrally disposed within the section 94 and extends upwardly through the top of the collector 14 to present a stack 100 which is provided with a tangentially disposed outlet duct 102.

The meal collector 14 is disposed atop a meal bin 104 which receives the comminuted agri-product and particulates from the collector and is provided with an outlet pipe 106 which directs the alfalfa to subsequent processing stations for pelleting, cooling and the like. The meal bin 104 is supported on a platform 108 which is positioned upon a pair of upright walls 110. The platform 108 also supports the blower 58 and the stack 64.

Another blower 112 which is driven by a motor 113 has its input communicated with the duct 102 by a conduit 114, while the output of the blower 112 is recycled to the collector-separator 12 through a return conduit 116 which extends into an opening in the top wall 38.

Although the dehydrating and processing apparatus described is operable under varying conditions most suitable for a particular application, certain negative pressure values have been arbitrarily assigned in the description which follows so that the operation of the equipment may be better understood. Thus, if it is assumed that the equipment is sized and operated so that blower 112 produces a negative pressure of −27 in. w.c. (water column) at point A (FIG. 1), this could result in a negative pressure of approximately −20 in. w.c. at point B in the meal collector, a pressure of approximately −15 in. w.c. at point C in the conduit 22, and a negative pressure of −10 in. w.c. in the hammer mill 68. The blower 58 would then optimumly be operated at a speed sufficient to result in a negative pressure of −10 in. w.c. at point D, and a negative pressure in the collector-separator 12 of approximately −7 in. w.c. at point E as a result of the negative pressure-inducing blowers 58 and 112. In addition, the pressure in the return conduit 116 would also be negative at a value of approximately −     in. w.c. It is to be emphasized though that the stated pressures are merely illustrative of the relative pressures throughout the apparatus and could be varied over a considerable range, provided sufficient negative pressure differentials are maintained to assure the flow of material through the apparatus in the direction of the arrows in FIGS. 1 and 2.

Freshly cut agri-product and particulates, which have a certain moisture content, are introduced into the dryer 10 by auger 16, and the moisture content is significantly reduced by the heat from the burner 20. As the agri-product and particulates reach the inlet of the dryer 10 they are immediately placed under the influence of blower 58 which gradually draws the agri-product and particulates through the rotary dryer and then pneumatically conveys the product into the collector-separator 12. The cyclone action within the collector-separator 12 is indicated by the arrows in FIG. 3. Because the particle and fluid flow are introduced tangentially into the collector-separator 12, a circular motion is imparted thereto and the heavier agri-product and particulates are conveyed circularly and to only a limited extent downwardly around the outside edge of the sections 26, 28 and 30. The circular downward motion of the conveying media near the outer surface of the collector-separator 12 creates an updraft at the center of the flow which is illustrated by the upwardly inclined arrows. This action is facilitated by the blower 58 which draws the conveying media up through the centrally located shroud 40.

It will be appreciated that as the heavier agri-product and particulates are conveyed toward the outlet opening 50, the conveying media is cleaned by centrifugal force and enters shroud 40 to be removed through the opening 52. Since the agri-product and particulates are placed under the influence of fluid flow induced by the blower 112 as soon as they reach the opening 50, they are removed from the collector-separator 12 while still in motion, thereby preventing buildup of any material along the bottom wall 32. The location of the circular section 28 beneath the frustoconical section 26, serves to limit the downdraft in the collector-separator 12 to a substantially circular motion to facilitate the removal of the agri-product and particulates and prevent slowdown of the motion of the particulate materials attributable to the gravitational movement as contrasted with centrifugal action. In this regard, location of the duct 48 tangentially to the section 28 allows the separated agri-product and particulates to be drawn from the collector-separator 12 while still in motion, thus substantially precluding any material buildup along the bottom wall 32. By constructing the frustoconical section 26 so that it has a height no greater than half the height of an imaginary cone superimposed on the section, superior separation is achieved by virtue of the fact that the solid components remain under a high centrifugal force while conveyed through the separator, and the agri-product and particulates are removed before they have a chance to recontact the conveying media as would be the case if the section 26 more nearly approached a conical configuration as in a conventional cyclone separator.

The negative pressure of −10 in. w.c. in the hammer mill 68 draws the agri-product material through the conduit 66 and into the interior of the hammer mill wherein the product is pulverized by the action of the hammer elements 74. When the agri-product has been reduced to a size determined by the mill screen 76, it passes therethrough and is drawn through the conduit 88 by the increasingly negative pressure produced by the blower 112.

As the comminuted agri-product enters the top of the meal collector 14, it gravitates downwardly to separate from the conveying media induced blower 112 which is directed through the conduit 114 in the direction of the blower. The separated agri-product particles from the collector 14 are selectively removed through the air lock 92. The output from the blower 112 is returned to the collector-separator 12 to thereby recycle any fine particles which have become entrained within the conveying media. Also, by returning the output of the blower 112 to the collector-separator 12, the blower is operating against a more negative pressure than would be the case if it were operating against the atmosphere, thus reducing the power requirements for the motor 113. It is thus apparent that two-stage cyclone separation is provided by separators 12 and 14 with recirculation of the second stage conveying media back to the first stage and with efficient removal of solid materials being assured by virtue of the unique configuration and operational characteristics of separator 12.

Having thus described the invention, what is claimed as new and desired to be secured by Letters Patent is:

1. Apparatus for separating a particulate material from a fluid conveying media under a negative pressure comprising:
   a separator having a top wall, a bottom wall and first frusto-conical section of a height no greater than half the height of an imaginary cone superimposed upon said section, the base of said imaginary cone being coextensive with the widest diameter of said section said bottom wall being tapered to present a second frust-conical section.
   an upper, generally cylindrical section disposed in stacked relationship atop said first frustoconical section and interconnected between the latter and said top wall, said generally cylindrical section having an inlet opening for particulate material and fluid conveying media in a mixture located adjacent said top wall, the latter having a fluid conveying media outlet opening centrally located therein;
   a tubular shroud extending downwardly through said fluid conveying media outlet opening into said upper generally cylindrical section to a point proximal to the uppermost edge of said first frustoconical section with said inlet opening being located above the lowermost edge of the shroud, said shroud having a portion thereof extending above said top wall with an exhaust opening for said fluid conveying media being located therein;
   a lower generally cylindrical section disposed in stacked relationship beneath said first frustoconical section and interconnected between the latter and said bottom wall, said lower generally cylindrical section having a diameter substantially equal to the smallest diameter of said first frusto-conical section, and a particulate material outlet opening located in said lower generally cylindrical section adjacent said bottom wall;
   inlet structure extending tangentially from said separator and communicating with said inlet opening; and
   outlet structure extending tangentially from said separator and communicating with said particulate material outlet opening.

2. A closed loop negative pressure system for the separation and collection of a particulate material from a fluid conveying media which comprises:
   a separator having a top wall, a bottom wall and a frusto-conical section of a height no greater than half the height of an imaginary cone superimposed upon said section, the base of said imaginary cone being coextensive with the widest diameter of said section;
   an upper, generally cylindrical section disposed in stacked relationship atop said frustoconical section and interconnected between the latter and said top wall, said generally cylindrical section having an inlet opening for particulate material and fluid conveying media in a mixture located adjacent said top wall, the latter having a fluid conveying media outlet opening centrally located therein;
   a tubular shroud extending downwardly through said fluid conveying media outlet opening into said upper generally cylindrical section to a point proximal to the uppermost edge of said frustoconical section with said inlet opening being located above the lowermost edge of the shroud, said shroud also having a portion thereof extending above said top wall with an exhaust opening for said fluid conveying media being located therein;
   a lower generally cylindrical section disposed in stacked relationship beneath said frustoconical section and interconnected between the latter and said bottom wall, said lower generally cylindrical section having a diameter substantially equal to the smallest diameter of said frusto-conical section, and a particulate material outlet opening located in said lower generally cylindrical section adjacent said bottom wall;
   inlet structure extending tangentially from said separator and communicating with said inlet opening;
   outlet structure extending tangentially from said separator and communicating with said particulate material outlet opening;
   exhaust structure extending tangentially from said shroud and communicating with said exhaust opening;
   means including a first negative pressure-inducing blower operatively connected to said outlet structure for drawing particulate material from the separator under a negative pressure said means comprising a collector interconnected between said outlet structure and first blower on the input side of the latter for removing particulate material from said conveying media prior to passage thereof through said first blower;

a second negative pressure-incuding blower operatively connected to said exhaust structure for evacuating fluid conveying media from the separator;

means connecting said separator and first blower on the output side of the latter operative to return any uncollected particulate matter to said separator and complete said closed loop; and an air lock positioned at the bottom of said collector for the passage of particulate material therethrough without the introduction of a significant quantity of air from the atmosphere into the collector.

3. The system of claim 2 wherein said collector is positioned in a vertically spaced relationship above said separator.

* * * * *